March 1, 1949.  R. L. MALCOM  2,463,041
NOSE PAD WITH ATTACHING MEANS
Filed March 6, 1946
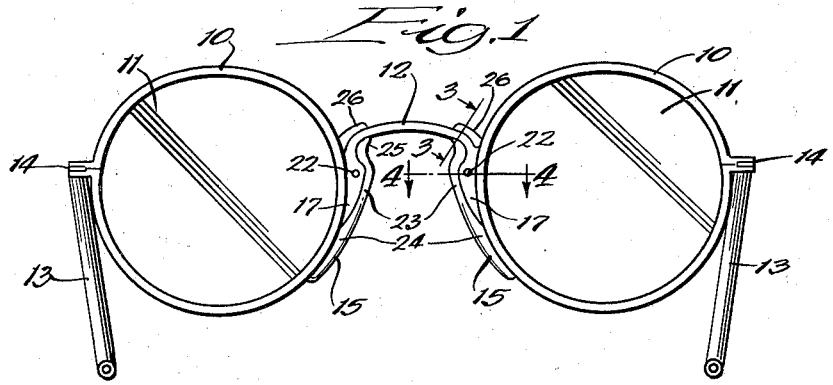
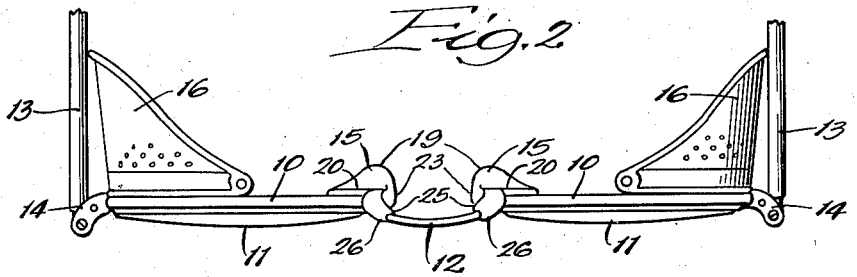
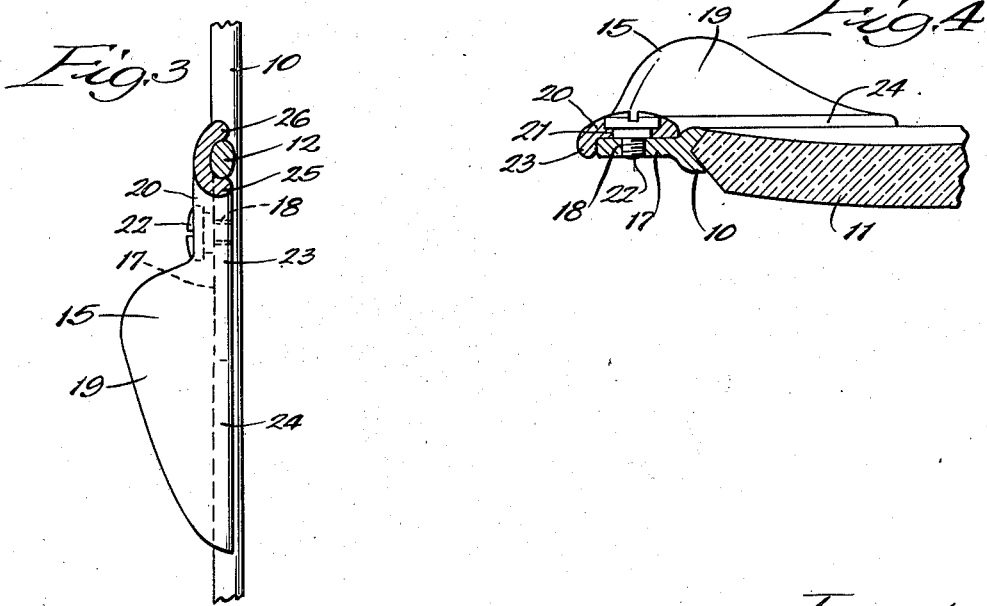
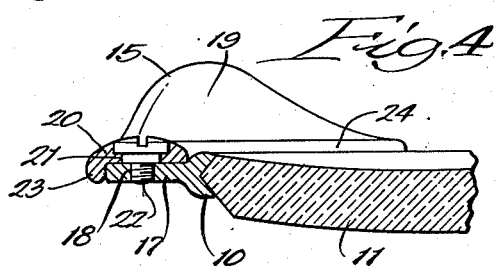
Inventor:
Robert L. Malcom,
By Dawson, Booth and Spangenberg,
Attorneys.

Patented Mar. 1, 1949

2,463,041

UNITED STATES PATENT OFFICE 2,463,041

NOSE PAD WITH ATTACHING MEANS

Robert L. Malcom, Chicago, Ill., assignor to Chicago Eye Shield Company, a corporation of Illinois Application March 6, 1946, Serial No. 652,373

7 Claims. (Cl. 88—48)

1

This invention relates to nose pads for glasses and finds particular utility in glasses of the type used for industrial purposes.

In present day glasses of this type the lens receiving rims are permanently connected by a bridge member and the nose pads are permanently secured thereto. Thus, upon breaking of a nose pad or upon the requirement of a different size or shape nose pad, it is extremely difficult to replace. The permanent connection between the bridge member and the nose pad is materially weakened if a substitution is attempted and usually it is necessary to substitute an entire bridge member including nose pads.

Also, in present day glasses the stocking problem is quite acute because of varying sizes and shapes of the noses of various individuals. Different shaped and sized nose pads and different shaped and sized bridge members are required and since these are permanently assembled a huge stock of assembled parts is required.

The principal object of this invention is to avoid the above difficulties by providing nose pads of varying size and shape that may be used with bridge members of varying size and shape and which permits ready and convenient substitution of nose pads without in any way weakening the connection between the pads and the bridge member.

In carrying out this object of the invention the bridge members of varying size and shape which connect the lens receiving rims are made substantially identical adjacent the lens receiving rims and are provided with an enlarged portion at each of these points provided with a hole therein. The nose pads of varying size and shape are provided with a portion to overlie the enlarged portion of the bridge member and also with a securing hole to coincide with the hole in the bridge member. The nose pads are also provided with a flanged portion to fit the contour of the enlarged portion of the bridge member and a portion of the lens receiving rim and to partially encompass a portion of the bridge member. These portions of the nose pads are made substantially identical so that they may be interchangeably used. A single screw cooperating with the holes removably attaches the nose pad to the bridge member and the flanged portion of the pads prevents the pads from rotating about the securing screw whereby the pads are rigidly held in place.

Other object and advantages will become apparent to those skilled in the art upon reference to the accompanying specification, claims, and drawing, in which—

Fig. 1 is a front elevational view of the glasses of this invention;

Fig. 2 is a top plan view of the same;

Fig. 3 is an enlarged sectional view taken substantially along the line 3—3 of Fig. 1; and Fig. 4 is an enlarged sectional view taken substantially along the line 4—4 of Fig. 1.

The glasses include a pair of lens-receiving rims 10 for receiving a pair of lenses 11. The lens-receiving rims 10 are connected by a bridge member 12. Suitable bows 13 may be pivotally connected as at 14 to the lens-receiving rims 10 for holding the glasses in place upon the wearer. The nose pads are designated at 15 and are secured to the bridge member 12. If desired the glasses may be provided with side shields 16 suitably secured to the lens-receiving rims 10.

The bridge member 12 may be welded or soldered to the lens-receiving rims 10, and adjacent the junctures between the bridge member 12 and the rims 10 the bridge member may be enlarged as at 17 and the enlargements may be provided with a screw threaded hole 18. Although the bridge member 12 may be made of varying size and shape, the enlarged portions 17 thereof and the portions of the bridge member adjacent the enlarged portions are preferably made substantially identical regardless of the size and shape of the bridge member.

The nose pads 15 are preferably made of plastic or other similar material and are provided with a raised nose-engaging portion 19 and a portion 20 which overlies and corresponds to the enlargement 17 of the bridge member 12.

The overlying portion 20 is provided with a countersunk hole 21 which coincides with the screw threaded hole 18 in the enlargement 17. A screw 22, threaded in the hole 18, secures the pad 15 to the enlargement 17 and because of the nature of the screw and the countersunk hole 21 in the pad 15, cracking of the pad 15 is prevented.

The pad 15 is also provided with a flanged portion 23 which fits the contour of the enlarged portion 17 of the bridge member and this flanged portion may extend as at 24 to fit the contour of a portion of the lens-receiving rim 10. The pad is also provided with flanged portions 25 and 26 which partially encompass a portion of the bridge 12 adjacent the enlargement 17. By reason of these flanged portions 23, 24, 25 and 26 of the nose pad 15 fitting the contour of the enlargement 17, the lens-receiving rim 10 and a portion of the bridge member 12, rotation of the nose piece 15 about the securing screw 22 is entirely prevented so that a rigid construction is provided even though only one screw is utilized for securing the nose pad to the bridge member.

The size and shape of the nose-engaging portion 19 of the nose pad 15 may be made differently to fit the nose of the wearer but the overlying portion 20 and the flanged portions 23, 24, 25 and 26 are made substantially identical regardless of the size and shape of the nose-engaging portion 19. In this way various nose pads 15 may be interchangeably applied to the bridge member 12.

With this invention it is therefore possible to readily interchange nose pads of varying size and shape on bridge members of varying size and shape merely by the manipulation of a single securing screw and in case of failure of a nose pad or in case of a desire to change nose pads, new nose pads may be readily substituted. In this way stocking of a number of bridge members of varying size and shape with nose pads of varying size and shape is no longer required.

While for purposes of illustration one form of this invention has been disclosed, other forms thereof may become apparent to those skilled in the art upon reference to this disclosure, and, therefore, this invention is to be limited only by the scope of the appended claims.

I claim as my invention:

1. A nose pad, for glasses having lens-receiving rims and a bridge member connecting the rims and having enlarged portions adjacent the rims provided with a hole, comprising, a pad member having a raised portion to fit the nose of the wearer, a portion to overlie one of the enlarged portions of the bridge member and having a securing hole to coincide with the hole in said enlarged portion of the bridge member, and a flanged portion to fit the contour of said enlarged portion of the bridge member to prevent rotation of the pad member about the securing hole.

2. A nose pad, for glasses having lens-receiving rims and a bridge member connecting the rims and having enlarged portions adjacent the rims provided with a hole, comprising, a pad member having a raised portion to fit the nose of the wearer, a portion to overlie one of the enlarged portions of the bridge member and having a securing hole to coincide with the hole in said enlarged portion of the bridge member, and a flanged portion to fit the contour of said enlarged portion of the bridge member and a portion of one of the lens-receiving rims to prevent rotation of the pad member about the securing hole.

3. A nose pad, for glasses having lens-receiving rims and a bridge member connecting the rims and having enlarged portions adjacent the rims provided with a hole, comprising, a pad member having a raised portion to fit the nose of the wearer, a portion to overlie one of the enlarged portions of the bridge member and having a securing hole to coincide with the hole in said enlarged portion of the bridge member, and a flanged portion to fit the contour of said enlarged portion of the bridge member and to partially encompass a portion of the bridge member to prevent rotation of the pad member about the securing hole.

4. A nose pad, for glasses having lens-receiving rims and a bridge member connecting the rims and having enlarged portions adjacent the rims provided with a hole, comprising, a pad member having a raised portion to fit the nose of the wearer, a portion to overlie one of the enlarged portions of the bridge member and having a securing hole to coincide with the hole in said enlarged portion of the bridge member, and a flanged portion to fit the contour of a portion of one of the lens-receiving rims to prevent rotation of the pad member about the securing hole.

5. A nose pad, for glasses having lens-receiving rims and a bridge member connecting the rims and having enlarged portions adjacent the rims provided with a hole, comprising, a pad member having a raised portion to fit the nose of the wearer, a portion to overlie one of the enlarged portions of the bridge member and having a securing hole to coincide with the hole in said enlarged portion of the bridge member, and a flanged portion to partially encompass a portion of the bridge member to prevent rotation of the pad member about the securing hole.

6. A nose pad, for glasses having lens-receiving rims and a bridge member connecting the rims and having enlarged portions adjacent the rims provided with a hole, comprising, a pad member having a raised portion to fit the nose of the wearer, a portion to overlie one of the enlarged portions of the bridge member and having a securing hole to coincide with the hole in said enlarged portion of the bridge member, and a flanged portion to fit the contour of a portion of one of the lens-receiving rims and to partially encompass a portion of the bridge member to prevent rotation of the pad member about the securing hole.

7. A nose pad, for glasses having lens-receiving rims and a bridge member connecting the rims and having enlarged portions adjacent the rims provided with a hole, comprising, a pad member having a raised portion to fit the nose of the wearer, a portion to overlie one of the enlarged portions of the bridge member and having a securing hole to coincide with the hole in said enlarged portion of the bridge member, and a flanged portion to fit the contour of said enlarged portion of the bridge member and a portion of one of the lens-receiving rims and to partially encompass a portion of the bridge member to prevent rotation of the pad member about the securing hole.

ROBERT L. MALCOM.

REFERENCES CITED

The following references are of record in the file of this patent:

UNITED STATES PATENTS

| Number | Name | Date |
| --- | --- | --- |
| 2,354,603 | Malcom | July 25, 1944 |